(12) United States Patent
Sollo

(10) Patent No.: US 6,782,599 B1
(45) Date of Patent: Aug. 31, 2004

(54) PROCESS FOR THE MANUFACTURE OF COOKING VESSELS AND VESSELS OBTAINED ACCORDING TO SUCH PROCESS

(75) Inventor: Giovanni Sollo, Naples (IT)

(73) Assignee: Societá Italiana Pentole (IT)

( * ) Notice: Subject to any disclaimer, the term of this patent is extended or adjusted under 35 U.S.C. 154(b) by 0 days.

(21) Appl. No.: 10/276,899

(22) PCT Filed: May 19, 2000

(86) PCT No.: PCT/IT00/00202

§ 371 (c)(1),
(2), (4) Date: Jul. 25, 2003

(87) PCT Pub. No.: WO01/87514

PCT Pub. Date: Nov. 22, 2001

(51) Int. Cl.[7] ................................................ A47J 36/00
(52) U.S. Cl. .................. 29/521; 220/573.3; 220/573.1; 403/279; 403/280; 403/285; 219/621
(58) Field of Search ................................ 29/896.6, 428, 29/432, 437, 438, 505, 514, 521, 524.1, 904; 220/573.1, 573; 219/621, 624; 403/279, 280, 281–285; 428/615

(56) References Cited

U.S. PATENT DOCUMENTS

| | | | | |
|---|---|---|---|---|
| 2,888,742 A | * | 6/1959 | Stumbock | 428/556 |
| 3,831,258 A | * | 8/1974 | Elbert et al. | 428/592 |
| 4,544,818 A | * | 10/1985 | Minamida | 219/621 |
| 5,345,667 A | * | 9/1994 | Coppier | 29/505 |
| 5,430,928 A | * | 7/1995 | Flammang | 29/460 |

* cited by examiner

*Primary Examiner*—J Cuda Rosenbaum
*Assistant Examiner*—Stephen Kenny
(74) *Attorney, Agent, or Firm*—Leffert Jay & Polglaze, P.A.

(57) ABSTRACT

A process for the manufacture of cooking vessels, in particular pots and/or pans and the like suitable for magnetic induction heating, is remarkably simple and comprises the steps of: providing a metallic semimanufactured vessel (A) of the cooking vessel, comprising a hollow (21) and a bottom portion (20); providing a plate member (1), in a metallic material of relatively high hardness, provided with a plurality of points (6a, 6b) projecting from a surface thereof (4) and forming an angle ($\alpha$) equal to or larger than 90° therewith; inducing, by compression or the plate member (1) at the bottom portion (20), the penetration of said points (6a, 6b) and the adhering of said surface (4) of said plate member (1) on said bottom portion (20).

20 Claims, 4 Drawing Sheets

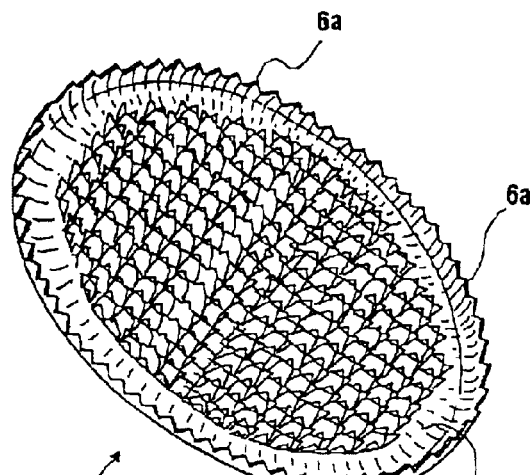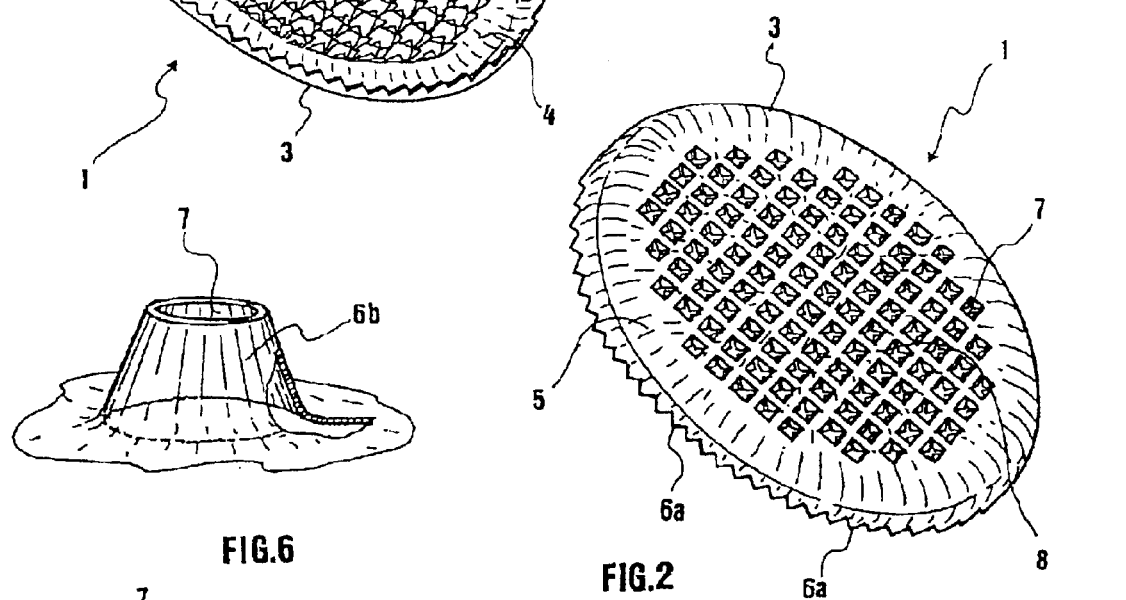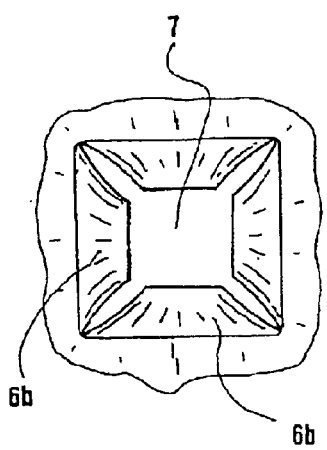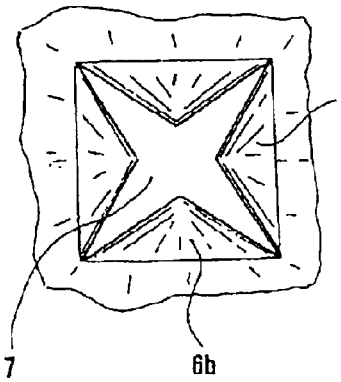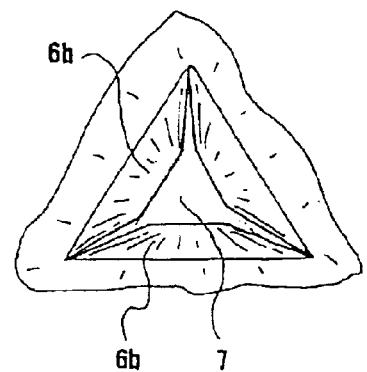
FIG.1  FIG.2  FIG.3  FIG.4  FIG.5  FIG.6

PROCESS FOR THE MANUFACTURE OF COOKING VESSELS AND VESSELS OBTAINED ACCORDING TO SUCH PROCESS

DESCRIPTION

The present invention relates to a process for the manufacture of cooking vessels, and also a vessel as above defined, obtained according to such process.

In particular, the invention relates to cooking vessels, e.g., of the type shaped starting from a flat member in a relatively soft metallic material, e.g., made of aluminium, and comprising a bottom portion reinforced with said plate member which is formed in a metallic material of relatively high hardness, e.g., steel-based, anyhow having properties making it heatable with a magnetically induced current.

Of course, it has to be understood that the present invention further relates to different cooking vessels, like, e.g., those formed by die-casting or extrusion.

The type of vessel generally comprises pots and pans, also comprising different vessels, like coffee makers, kettles, grill plates etc.

The processes and the related vessels of the above specified type are known in the art. For instance, the French Patent Application No. 91 03695 and the European Patent No. 0,604,617, in the name of SEB S. A., describe a step in which the plate member and the flat member are reciprocally connected with a hot press-stamping.

In this step, the soft material of the flat member is heated and softened. Then, the plate member, that is provided with holes and/or fissures, is press-stamped, e.g. with a hammer or the like, in such a way that the steel plate member is embedded into the aluminium flat member while the latter, due to the induced pressure, penetrates inside said holes.

Such process is disadvantageous due to several reasons, among which the necessity of a step of heating the aluminium, with the entailed consumption of energy and time, and the need to protect the aluminium itself from oxidation processes.

In the European Patent No 0,509,860, a method is described for embedding a holed steel plate in an aluminium layer apt to be manufactured in order to obtain a cooking vessel. According to such method, the embedding is carried out with an energetic step of cold press-stamping, in which the malleability of the aluminium is exploited that is forced to penetrate inside the holes and the fissures of the plate to the level of the outer surface of the holed plate.

Such step, preceding the drawing of the aluminium layer, is a remarkable trauma for the materials, it requires the use of high pressures for the cold press-stamping, and implies the subsequent manufacturing steps to be carried out with an already applied plate.

Moreover, these two embodiments could entail problems due to the different thermal expansion of the materials used.

In the Swiss Patent No. 227,769 a further method is described for coupling, wherein a spiral-shaped reinforcing member is irreversibly forced inside a groove, of similar shape, formed on a face of the flat member in a soft material.

This method, besides entailing an additional step of hot- or cold forming of said groove, does not allow an application of a real plate member.

In the Italian Patent Application No. RM91A000355 a further method is described, according to which a metallic plate of ferritic steel is fixed to the bottom of a pot by forcing and crimping the edge of the plate inside a peripheral groove surrounding the bottom of the pot already shaped.

This method, although performing an effective coupling without overly traumatising the material, does not provide a suitable reinforcement.

In light of the above described known art, the invention aims at attaining the object of manufacturing a cooking vessel provided with a plate bottom for heating of the magnetic induction type that can be manufactured in an easy and effective way.

The technical problem underlying the present invention is that of providing a process for the manufacture of cooking vessels allowing to overcome the drawbacks mentioned with reference to the prior art.

Such problem is solved by a process as above specified, characterised in that it comprises the following steps:

providing a metallic semimanufactured vessel of the cooking vessel, comprising a hollow and a bottom portion;

providing a plate member, in a metallic material of relatively high hardness, provided with a plurality of points projecting from a surface thereof and forming a angle greater than or equal to 90° therewith;

inducing, by compression of the plate member at the bottom portion, the penetration of said points and the adhering of said surface of said plate member on said bottom portion.

The present invention further relates to a cooking vessel obtained according to the process as above defined, further comprising deposition steps of one or more non-stick layers as well as finishing steps of the vessel.

The main advantage of the process for the manufacture according to the present invention lies in allowing an effective securing of the plate member without traumatising the materials and with no further specific steps required.

Moreover, the manufacture of the cooking vessels can follow a normal manufacture process, comprising press-stamping and coining steps needed to secure the plate member, while the latter step can be carried out in parallel, yet in a substantially autonomous way.

Furthermore, with the above described process it is possible to secure a plate member regardless of the latter extension with respect to those of the bottom portion at issue.

Further, a vessel bearing a plate member coated with a layer of possibly non-stick coating can also be manufactured, without entailing additional manufacturing steps or a different arrangement of the work stations commonly used in the manufacture of cooking vessels.

The present invention will be hereinafter disclosed according to a preferred embodiment and to some variants thereof, given by way of example and not for limitative purposes. Reference will be made to the annexed drawings, wherein:

FIG. 1 shows a perspective view of a surface of a plate member that can be used in a process for the manufacture of cooking vessels according to the present invention;

FIG. 2 shows a perspective view of another surface of the plate member of FIG. 1;

FIGS. 3 to 5 show an enlarged plan detail of the plate member of FIG. 1, according to three independent variants thereof;

FIG. 6 shows a perspective view of a fourth variant thereof;

Figure 7:
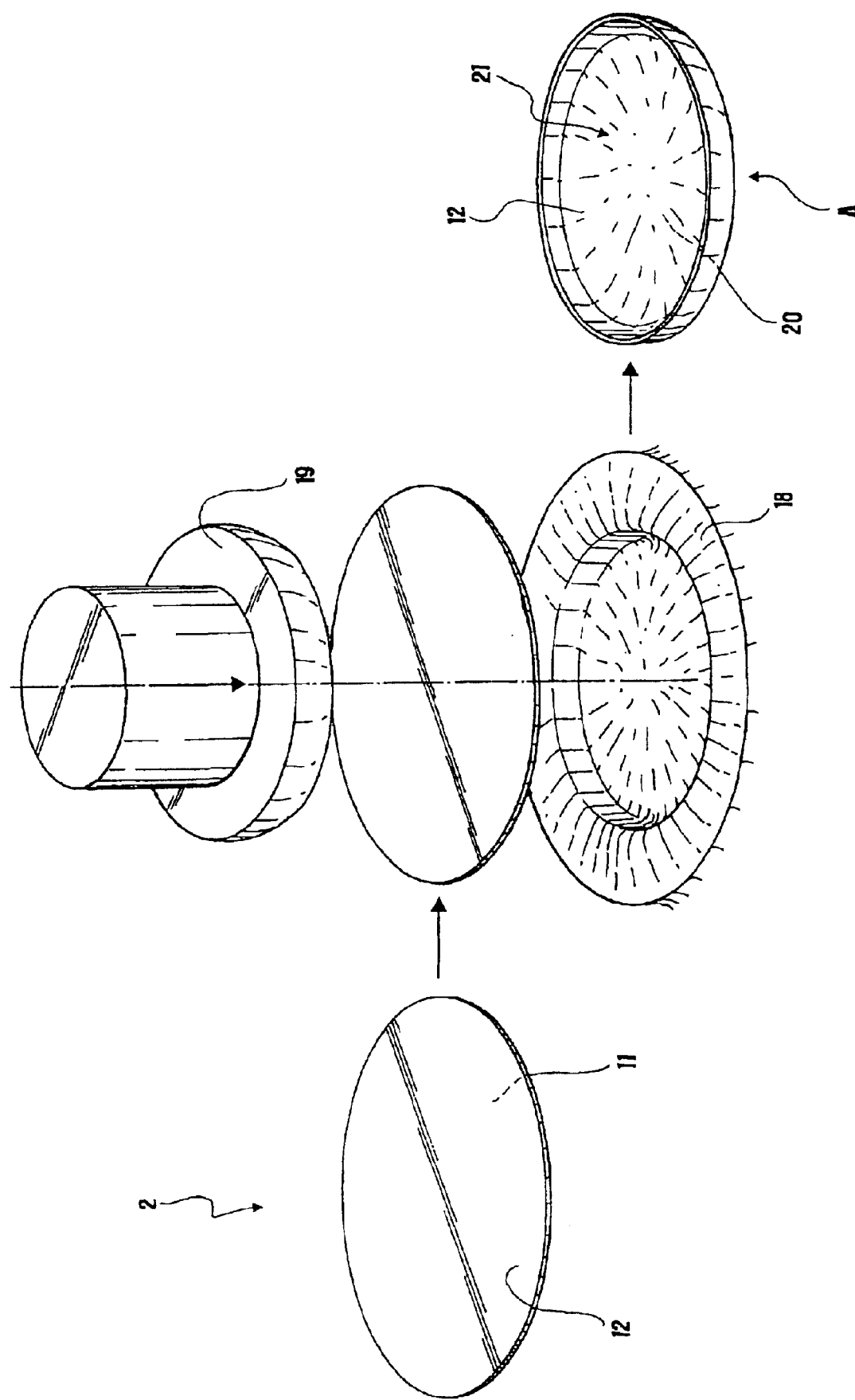
FIG. 7 shows a perspective view depicting a step of the process according to the invention.
Figure 8:
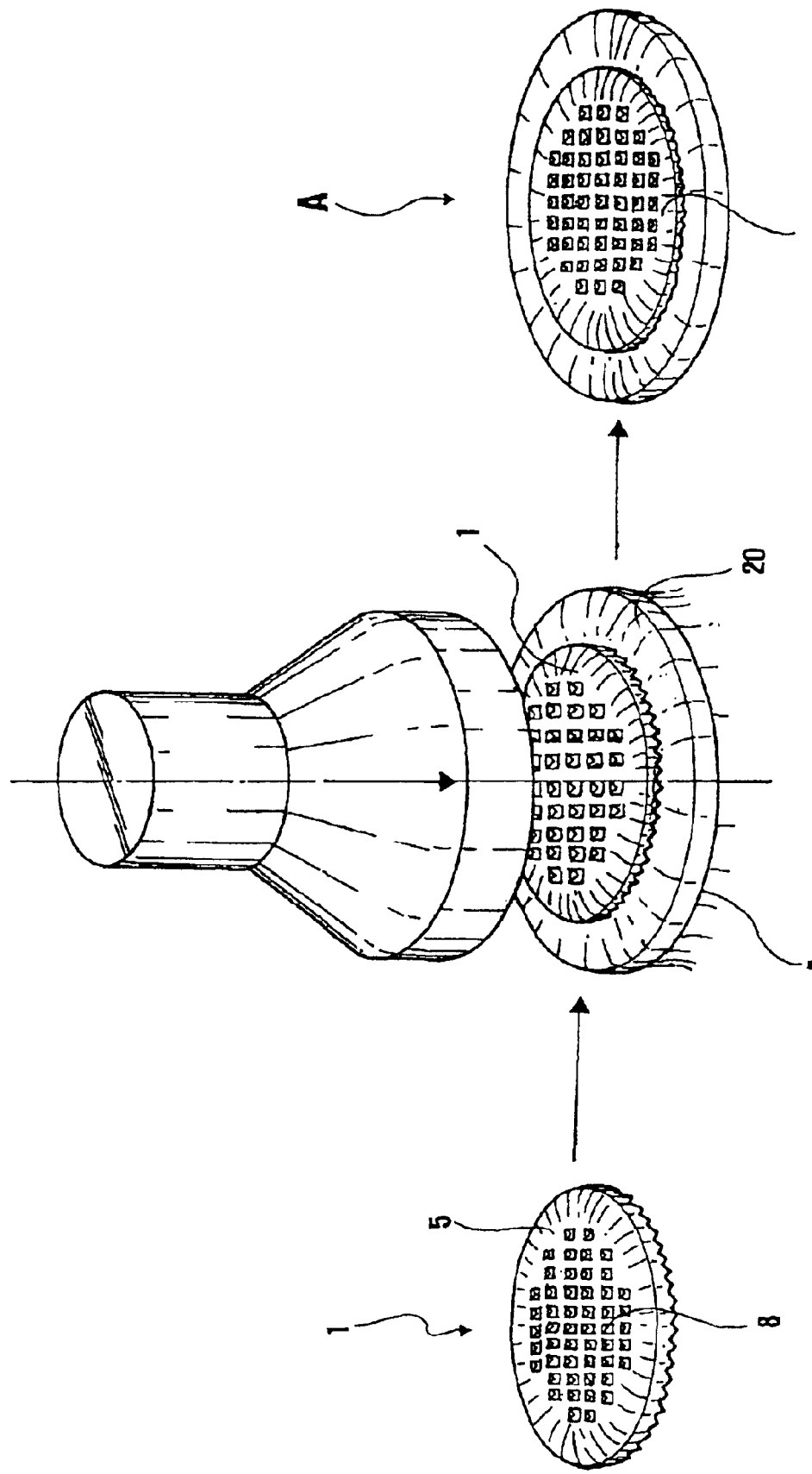
FIG. 8 shows a perspective view depicting a further step of the process according to the invention.

The process according to the present embodiment relates to the shaping of a pot or of a pan, provided with a reinforced bottom and non-stick surfaces.

With reference to FIGS. 1 to 2, one embodiment of a plate member is shown, that hereinafter is generally indicated with 1, apt to be used in the process herein disclosed.

The plate member 1 is in a metallic material of a relatively high hardness, being apt to be applied in the field of the cooking vessels, like pots or pans, manufactured in a relatively soft metallic material and starting from a flat member, indicated with 2 in the next figures, manufactured just in said relatively soft metallic material.

With reference to said materials, said relatively soft metallic material is exemplified without limitative purposes by the aluminium, that is conventionally used in the manufacture of said vessels, or by an alloy substantially based on said metal. The relatively soft metallic material used in the embodiments of the process disclosed hereinafter is aluminium.

Concerning instead the metallic material of a relatively high hardness, it has to have a hardness such as to be capable of deforming said relatively soft metallic material.

An example of a metallic material of relatively high hardness apt to be used in the process according to the invention is a steel.

In particular, in order to obtain a cooking vessel apt to be heated with magnetic induction, a metallic material of a relatively high hardness provided with adequate magnetic properties is preferred. Advantageously, a type of metallic material of relatively high hardness that is used in the embodiments disclosed hereinafter is a steel of ferritic type, shortly called ferritic steel.

The plate member 1 is substantially disc-shaped and comprises a circular edge 3, a first surface 4 apt to be adhered to said flat member 2, and a second surface 5, apt to be exposed to the outside.

Said plate member 1 is provided with a plurality of projecting members integrally formed with the plate member 1 and projecting, in a substantially vertical way, from said first surface 4. In the present embodiment (FIGS. 1 to 5), the projecting members are points, yet, more generally, the projecting members formed at the bottom are apt to describe an uneven contour due to reasons that will be further detailed hereinafter.

The projecting members, or points, are substantially subdivided into two distinct types: the first projecting members, or the first points 6a, generally are annularly placed at the edge 3 and the second projecting members, or the second points 6b, are formed starting from the solid metallic layer of the plate member 1.

In case of the first points 6a, they are performed e.g., by shearing and bending, preferably with a continuous and uninterrupted distribution on said edge 3.

In case of the points 6b, they are formed by punching, carried out using a punch having a drift-pin and flat side faces jointed by sharp edges. Thus, the drift-pin of the punch penetrates into the metallic layer while the sharp edges cut the edges of the points and the faces bend upright the points thus formed.

The number of second points 6b formed by each drift-pin depends on the number of side faces of the drift-pin. To each drift-pin further corresponds a hole 7 at which second points 6b are formed in said number.

With reference to FIGS. 3 to 5, three different variants of second points 6b are described: a first variant provides a square hole 7 obtained with a bevelled drift-pin that has formed substantially trapezoid-shaped second points 6b; a second variant provides a square hole 7 obtained with a keen drift-pin, that, hence, forms substantially triangle-shaped second points 6b having a sharp apex; the third variant is similar to the first one and provides a triangle-shaped hole 7, obtained with a triangled-section drift-pin, and second points 6b having a blunt apex.

With reference to FIG. 4 and by way of example, a squared-section drift-pin performs four second points 6b per each hole 7, each second point 6b having an apex with a spread of approximately 90°.

In any case, the second points 6b form, from the apexes thereof to the plane of the plate member, a substantially pyramidal duct, with a cone-shaped cross section increasing from the apexes to the plane of the plate member 1. The cone spread can be minimal, therefore the points 6b form, with the plate member 1, an angle α equal to or greater than 90°, preferably greater than 90°.

With reference to FIG. 6, a fourth variant of a second projecting member 6b consisting of a cone-shaped structure shaped around the hole 7 is depicted. It is obtained with a cylindrical drift-pin provided with an end that is capable to shear an end pinhole at the cone apex. In this case, the performed duct is cone-shaped rather than pyramidal, attaining however the same aim.

In a preferred embodiment of the invention, the height of the second projecting members 6b is greater than that of the first projecting members 6a. By way of example, for an aluminium pan of average thickness, the second projecting members can have a 2.5+3.0 mm height, as it will be made apparent hereinafter, in order to ensure a better crimping, whereas the first projecting members 6a can have a 1.8+2.0 mm height, for ensuring a satisfactory clutching while allowing the passage of the compressed soft material.

However, it is understood that the thickness of the projecting members will be determined by the thickness of the vessel to which it will be applied in the way that will hereinafter be disclosed.

For thick bottoms of 10 mm or greater, the projecting members could have a height of 8.0 mm or greater.

Concerning instead the thickness of the plate member, it also could vary according to the required specifications, in a range from 0.1 to 3.0 mm and greater.

With reference to FIGS. 1 and 2, said plate member 1 comprises a plurality of holes 7, each having respective second points 6b, grouped together in a central portion 8 of the plate member 1.

It is understood that the central portion could even engage the entire surface of the plate member 1, or it could be subdivided into one or more subportions. Preferably, in every variant, the surface engaged by the holes 7 onto the plate member is at least equal to the 50% of the total surface.

With reference to FIGS. 7 to 11, hereinafter the process for the manufacture according to the invention will be disclosed.

The process comprises an initial step in the manufacture sequence, consisting in providing said flat member 2 of a metallic material. In the present preferred embodiment, said flat member is a disc of predetermined thickness, apt to be transformed through the subsequent steps in a cylindrical cooking vessel having a circular section.

Obviously, starting from a member of a different shape, a vessel having a different shape can be obtained, e.g. one having an ellipsoidal section starting from an ellipsoid or a prismatic saucepan starting from, a substantially quadrilateral member.

Said aluminium disc, that forms the flat member 2, in the following and is likewise indicated with 2 in the figures, undergoes a first step of superficial polishing treatment, with the removal of a possible oxidised layer. Such surface treatment can be carried out with any superficial removal method such as pickling, grinding, pumicing, sandblasting and the like.

The preferred treatment is pickling, since, as it can be observed with a microscope, the aluminium surface finishing after the pickling has a plurality of pores comprising surface opening having a narrowed section and a widened hole.

Such pore structure is particularly suitable to receive a coating layer, e.g. of polymeric type, that will be applied at the end of the process.

On the disc 1 a first surface 11 is evidenced, apt to form the outer surface of the vessel that is being manufactured, and a second surface 12, apt to form the inner surface of the vessel that is being manufactured.

The process according to the present embodiment comprises a forming step of shaping the disc 2.

In the process according to the present invention, such shaping is carried out with the performing of a step in which said flat member 2 undergoes a stretching at least at a central portion of the disc 2, apt to form the bottom 20 of the semimanufactured vessel, indicated with A, of the cooking vessel that is being manufactured.

Such shaping takes place, in its most general aspect, at the press and in particular takes place by a drawing of substantially normal type, operated using a matrix 18 and a drawing punch 19 that cooperate with the aid of a pressure bar, not shown (FIG. 7).

Obviously, the drawing punch 19 operates on the second surface 12 of the disc 2 while the matrix 18 is put in contact with the first surface 11.

The drawing is advantageously of a simple type, implying only one pressure, regardless of the shape of the vessel to be produced.

In fact, with the above described process any kind of pot or pan can be manufactured: pans, saucepans and skillets having more or less high lateral walls, cylindrical or ellipsoidal sectioned pots, cake-tins, cup-formed or inverted frustocone-shaped pots or saucepans, provided they have said bottom portion 20 substantially plane or anyhow convex to avoid bulgings deriving from thermal strain.

Therefore, in general, the metallic semimanufactured vessel 20 of the cooking vessel comprises a bottom portion and a hollow 21.

It is understood that this shaping step can be carried out according to different operation modes. In particular, the semimanufactured vessel A can be obtained by die-casting or extrusion, or press-stamping of a flat member of remarkable thickness at extremely high pressures, causing the aluminium to behave like a liquid, forcing it to evenly fill up the die cavity.

With likewise processes, also vessels differing from the usual pots and pans, like coffee makers, kettles, peculiarly shaped pots, grills, plates etc. to which the present invention relates can be formed.

In these cases, the surface treatment step, the pickling, can follow, rather than precede, the shaping.

The process for the manufacture according to the present invention comprises a step wherein a plate member 1 is provided as aforedescribed with reference to the variant of FIGS. 1 to 3.

After the shaping step and the pickling, the process according to the present embodiment comprises a step wherein the penetration of said first and second points 6a, 6b into the thickness of the flat member, i.e., of the aluminium disc 1, is induced by compression. Said compression step, can take place e.g., by press-stamping (FIG. 8) of the plate member 1 on the bottom portion 20 of the semimanufactured vessel A, at said first surface 11 of the disc 2, i.e. outside the vessel.

After the compression, the adhering of said first surface 4 of the plate member 1 onto the bottom portion 20 is also induced.

To this end, the diameter of the plate member 1 is smaller or almost equal to that of said bottom portion 20.

Figure 10:
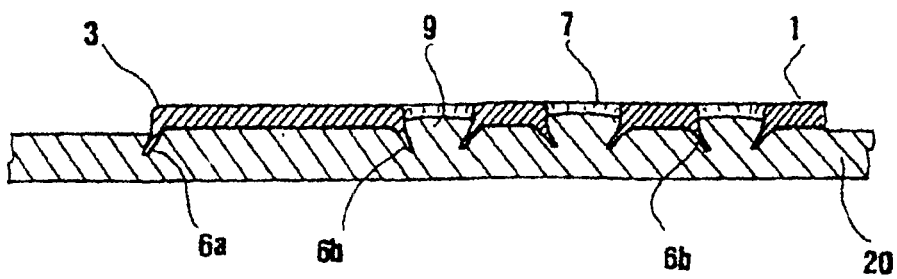

At this step, a peculiar behaviour of the aluminium of the disc 2 can be observed, i.e., being softer and inserted in a widening section duct, it tends to expand inside each hole 7 forming a sort of rivet 9 that clutches the plate member 2 to the bottom portion 20 (FIG. 10). This effect is determined by the shape of the conical or pyramidal duct delimited by the second projecting members 6b.

Moreover, the second points 6b undergo a slight tilting with respect to the original arrangement thereof, induced by the displacement and by the compression of the aluminium bored by the points 6a, 6b. This concurs to implement a stable clutching by crimping (FIG. 10).

Further, the first points 6a on the edge 3 of the plate member 1 undergo a slight outward tilting of the plate member 1 while allowing two effects important for a successful clutching: the effective adhering of the edge 3 of the plate member 1 onto the surface 11 by clutching; and the passage, between the first points 6a, i.e. at said uneven contour, of a limited amount of aluminium compressed by the second points 6b, in order to avoid bulgings and residual strain in the materials (FIG. 10).

The passage of the compressed soft material is substantially eased by the difference in heights between the second and the first projecting members, 6a and 6b, respectively.

Actually, for crimping a bending of the end of each point 6a, 6b is to be understood, detaching off the original placement thereof, according to which the points 6a, 6b were induced to penetrate in said thickness of the bottom portion 20.

Thus, a possible dislocation of the plate member 1 according to said original direction of penetration is finally prevented.

Further, such crimping makes the connection between the plate member 1 and the semimanufactured vessel A firmer, and it is capable to improve the reinforcing of the bottom portion 20 in comparison with the application processes of the known plate member, without causing to the materials thermal and/or mechanical trauma not substantially already envisaged by the usual manufacturing processes of the cooking vessels.

The press-stamping, performed on an even surface plate, is a limited trauma for the semimanufactured vessel A. In any case, such press-stamping can be carried out practically on any aluminium thickness.

By virtue of the intimate connection between the semimanufactured vessel A, in a relatively soft material, and the plate member 1, in a harder material, a global reinforcement of the portion involved in the application of the plate member 1 is obtained.

Moreover, the penetration of a plurality of points 6a, 6b close among them, causes a localised work hardening of the softer material of the disc 2, which entails a stiffening of the disc 2 itself.

Figure 11:
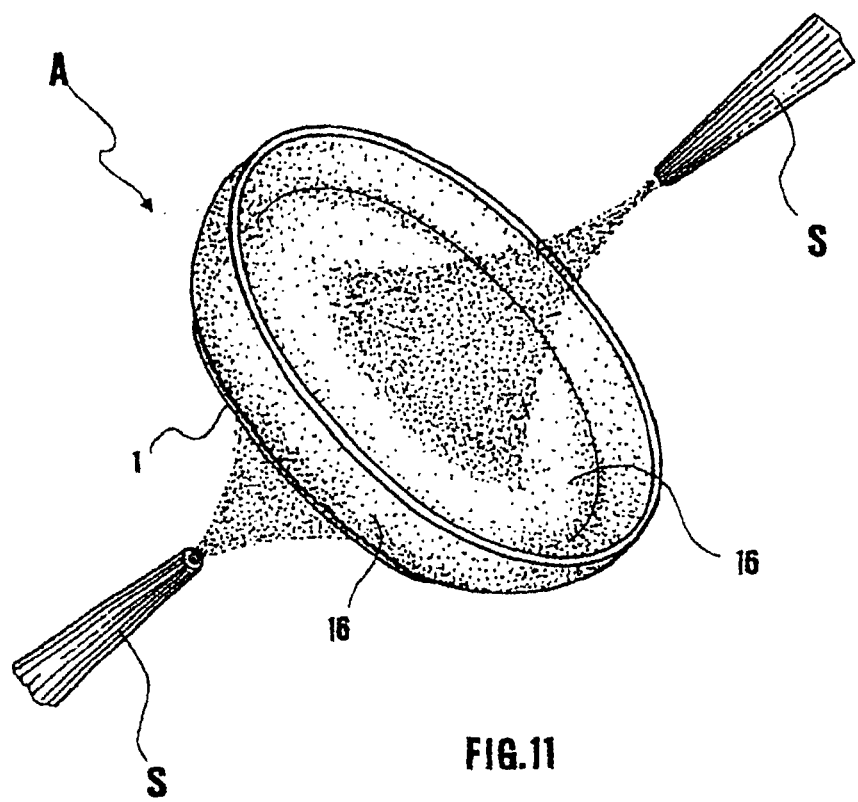
FIG. 11 further shows a process step subsequent to the preceding ones.
Figure 9:
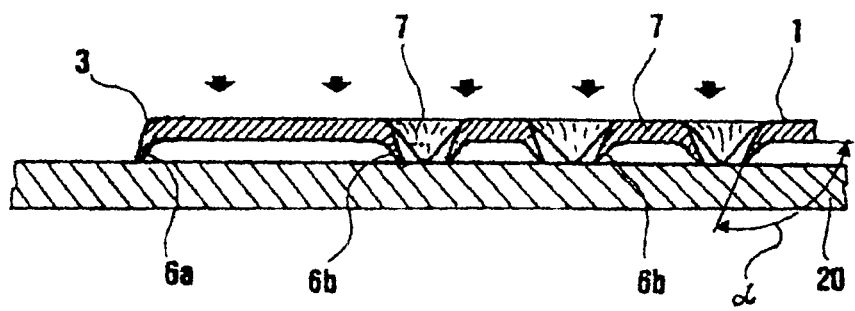
FIGS. 9 and 10 show respective sections of a detail of a vessel during the step of FIG. 8.

At the end of the above described press-stamping, the process according to the invention comprises a step of depositing one or more inner coating layers 16 on said first and second surface 11 and 12 (FIG. 11).

The deposition is conveniently preceded by a superficial polishing step, in particular of the bottom portion 20 bearing the plate member 1, with the removal of oxides or possible manufacture residues.

Conveniently, such polishing can be carried out with sandblasting.

The application of the inner layer 16 can be carried out with a spray, by suitable sprayers S, with the deposition of a coating layer 16 on both surfaces of the semimanufactured vessel.

In preferred embodiment of the present process, the inner coating layer 16 consists of non-stick polymeric substances, possibly mixed with pigments conferring to said first surface a particular colouring.

The preferred polymeric substance is a PTFE, in a dry weight percentage comprised in the range from 30 to 75%.

The total applied thickness of the outer layer or layers 13 is comprised in the range from 5 to 100 μm, preferably in the range from 20 to 40 μm.

The outer layer or layers 13 applied to the disc 1 are then fixed by heating, entailing a polymerisation of the basic material and a stabilisation of the pigment.

Preferably, such heating is carried out by baking, at a temperature conveniently higher than 380° C., to obtain a suitable polymerisation, and lower than 480° C.

The preferred baking temperature interval range is 390–450° C.

In any case, the heating time is not longer than a few minutes and anyhow shorter than 10 minutes.

According to a preferred but not exclusive method of the present embodiment, the coating layer 16 consists of a plurality of sublayers deposited in sequence with a spraying application.

With such application method, the forming of one or more coating layers 16 having a predetermined and controlled thickness, with the penetration of the innermost layer in said pores of the aluminium, eased just by the shape of the latter, is allowed.

In any case, the coating layer 16 thus applied is capable of hiding, i.e. to make invisible, the impressions possibly left on said second surface 12 in the previous step of coining.

It has to be pointed out that the deposition of the coating layer over the entire surface of the semimanufactured vessel A entails the total coating of the plate member 1 from which residues and oxides have been removed beforehand. Thus, said plate member 1 is not air-exposed, hence being shielded from oxidation. Therefore, the material required for the plate member is not necessarily stainless steel: any ferrous material providing the required magnetic properties allowing the heating of the member by magnetic induction could be used.

Several variants of the coating step are possible. In fact, the application of the coating onto the outer surface 11 of the semimanufactured vessel A could precede the application of the plate member 1, whereas the application of the coating onto the inner surface 12 of the semimanufactured vessel A could follow it, thus hiding the impressions left thereon by the coining. In this case, the plate member should be made in a stainless material, i.e. in a steel, e.g., the AISI 430.

When instead it is desirable to coat the plate member, the outer coating can also be implemented with a coating differing from the above-mentioned PTFE.

In fact, enamels, that should be baked at a higher temperature range with respect to the PTFE one; from 550 to 600° C., or silicone- or acrylic-based hard gloss paints, requiring baking at a temperature range of from 170 to 280° C. could be used.

It is understood that the application sequence of the various coatings can be any one, as long as it is compatible with the physical-chemical and thermal characteristics of the various materials mentioned for the coating, the semimanufactured vessel and the plate member, also in order to implement an optimal adherence of any type of coating.

According to a further variant, in case the semimanufactured vessel is obtained by shaping a disc 2, the inner surface 12 can previously be painted with a roller and/or a silk screen printing stencil, even obtaining an uneven inner surface of the bottom, as taught, e.g., in the European Patent Application No. 93830112.

Once that the semimanufactured vessel has entirely been coated, the vessel itself can at last be finished with the trimming of the rim of the vessel, possibly in a step concomitant to the turning, the addition of handles, lids and other possible accessories.

Thus, a cooking vessel is manufactured, e.g., pan-shaped with only one projecting handle, having a bottom portion 20 reinforced with a plate member 1.

The vessel obtained with the process according to the invention has remarkable non-stick qualities both inside and outside, with long lasting non-stick layers.

To the above described process for the manufacture of cooking vessels with a coined bottom, a person skilled in the art, in order to satisfy further and contingent needs, may introduce several further modifications and variants, all however comprised within the protective scope of the present invention, as defined by the annexed claims.

What is claimed is:

1. A process for the manufacture of cooking vessels, in particular pots and/or pans in a relatively soft metallic material, characterised in that it comprises the following steps:

providing a metallic semimanufactured vessel (A) of the cooking vessel in a relatively soft metallic material, comprising a hollow (21) and a bottom portion (20);

providing a substantially disc-shaped plate member (1), in a metallic material of a relatively high hardness, comprising an edge (3), a first surface (4) apt to be adhered to said bottom portion (20) and a second surface apt to be exposed to the outside and a plurality of holes (7), said plate member (1) being provided with a plurality of projecting members (6a, 6b) substantially subdivided in first points (6a), annularly placed at said edge (3), and second points (6b) formed at said holes (7); said second points (6b) projecting from said first surface (4) to form, from the apex thereof to the plane of the plate member (1), a substantially piramidal or conical duct and forming an angle (α) equal to or greater than 90° with the plane of the plate member (1);

inducing, by compression of the plate member (1) at the bottom portion (20), the penetration of said first and second points (6a, 6b) and the adhering of said first surface (4) of said plate member (1) on said bottom portion (20), whereby the respective end of each point (6a, 6b) is crimped by bending in the thickness of the bottom portion (20).

2. The process according to claim 1, wherein said metallic material of relatively high hardness is apt to be heated by induction.

3. The process according to claim 2, wherein said metallic material of relatively high hardness is a ferritic steel.

4. The process according to claim 1, wherein said points (6a, 6b) are integrally formed with the plate member (1).

5. The process according to claim 1, wherein the surface engaged by the holes (7) on the plate member (1) is at least equal to the 50% of the total surface thereof.

6. The process according to claim 1, wherein said points (6a, 6b) are formed by shearing and bending.

7. The process according to claim 1, wherein said second points (6b) are performed by punching of the plate member (1), using a keen or a blunt punch, at the respective hole (7) formed with said punching.

8. The process according to claim 7, wherein the second points (6b) have a height that is greater in comparison to that of the first points (6a).

9. The process according to claim 1, wherein said relatively soft metallic material is substantially aluminium-based.

10. The process according to claim 1, wherein said semimanufactured vessel (A) bearing said plate member (1) undergoes a step of superficial polishing treatment, with the removal of a possible oxidised layer.

11. The process according to claim 10, wherein said semimanufactured vessel (A) bearing said plate member (1) is coated with a coating layer (16).

12. The process according to claim 11, wherein the outer coating layer (16) consists of non-stick polymeric substances.

13. The process according to claim 12 wherein said non-stick polymeric substances are mixed with pigments.

14. The process according to claim 12, wherein said polymeric substances comprise PTFE, in a dry weight percentage comprised between 30% and 75%.

15. The process according to claim 12, wherein the total applied thickness of the outer layer (13) is comprised in the range 5–100 μm.

16. The process according to claim 12, wherein the coating layer (16) is fixed by heating, carried out by baking, at a temperature higher than 380° C. and lower than 480° C. for a heating time shorter than 10 minutes.

17. The process according to claim 12, wherein the coating layer (16) consists of a plurality of sublayers deposited in sequence.

18. The process according to claim 11, wherein the coating layer (16) entirely coats the semimanufactured vessel (A).

19. The process according to claim 18, wherein the coating layer (16) entirely coats said plate member (1).

20. The process according to claim 11, wherein the coating layer comprises an outer coating comprising PTFE, enamel, silicone paint, acrylic paint.

* * * * *